Patented June 28, 1932

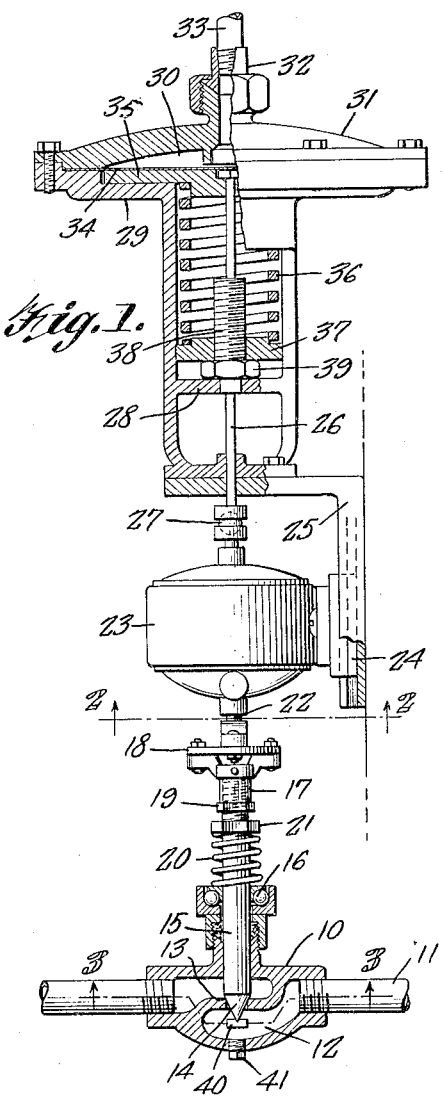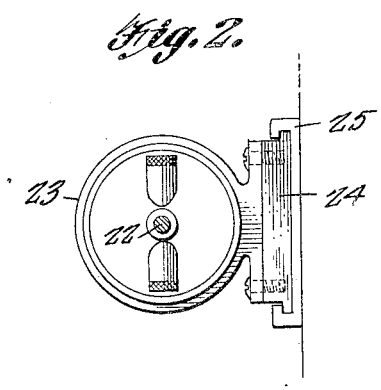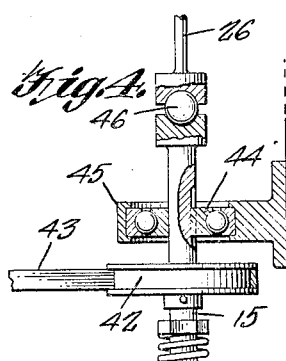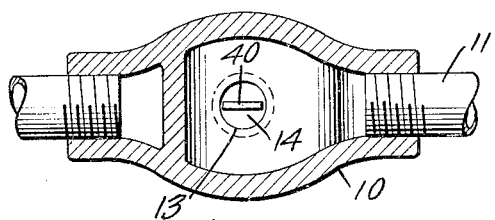

1,865,316

UNITED STATES PATENT OFFICE

RICHARD HANRAHAN AND GEORGE LACASSE, OF MISSOULA, MONTANA

REVOLVING NEEDLE VALVE STEM AND GOVERNOR

Application filed March 21, 1930. Serial No. 437,887.

This invention relates to valves especially designed for controlling the fuel supply to oil burners, an object being to provide a valve which will permit of the use of oil of low specific gravity, and thus reduce the cost of operation of the burner through the use of a cheap grade of oil, as well as by the use of increased heat furnished by oils of this character.

Another object of the invention is the provision of a valve for the above purpose which employs a revolving stem having means controlled by the operation of the stem and located within the valve passage to break up the heavy oil and thus eliminate danger of clogging the valve passage.

Another object of the invention is the provision of pressure operative means capable of use with a rotary valve stem for controlling the valve, so that the fuel may be fed to the burner in accordance with the amount of steam generated.

With the above and other objects in view, the invention further includes the following novel features and details of construction to be hereinafter more fully described, illustrated in the accompanying drawing and pointed out in the appended claims.

In the drawing:

Fig. 1 is a sectional view illustrating the invention.

Fig. 2 is a section on the line 2—2 of Fig. 1.

Fig. 3 is an enlarged fragmentary section on the line 3—3 of Fig. 1.

Fig. 4 is a fragmentary view partly in section and partly in elevation, illustrating a slightly different form of the invention.

Referring to the drawing in detail wherein like characters of reference denote corresponding parts the reference character 10 indicates the casing of a valve which is connected in a supply pipe 11 for the supply of fuel oil to a burner.

This casing is provided with a passage 12, within which is arranged a valve seat 13 and the latter is adapted to be engaged by the pointed extremity 14 of a needle valve stem 15.

The stem 15 extends upward through a suitable packing gland and through a thrust bearing 16 and has threaded connections with the sleeve 17 extending from a flexible coupling 18. The stem 15 may thus be adjusted with respect to the valve seat and held in adjusted position by means of a lock nut 19. A spring 20 bears upon the bearing 16 and the tension of this spring is regulated by means of an adjusting nut 21.

The flexible coupling 18 serves to connect the stem 15 with one end of the shaft 22 of a motor 23, the latter being slidingly and adjustably mounted as shown at 24 in a suitable bracket 25.

The opposite end of the motor shaft 22 is connected with one end of a stem 26 by means of a universal coupling 27. This stem extends through a guide 28 which supports the bottom 29 of a diaphragm chamber 30, the cover or top of this chamber being indicated at 31. A coupling or union 32 provides means for connection with a steam supply pipe 33 which is in communication with the diaphragm chamber 30 so as to act upon a diaphragm 34. The upper end of the stem 26 is connected with this diaphragm. The diaphragm 34 is engaged by a disc 35 and this disc is in turn engaged by a spring 36. A follower 37 engages the lower end of the spring and extending through this follower is a threaded sleeve 38. This sleeve surrounds the stem 26 and carries an adjusting nut 39 by means of which the tension of the spring may be regulated.

Pressure of steam within the chamber 30 will act upon the diaphragm to force the valve stem 15 downward, the degree of movement being governed by the amount of pressure. Thus, when the steam pressure builds up, the supply of fuel through the passage 12 and pipe 11 will be reduced. As soon as the steam pressure falls, the stem 15 will move upward under the action of the spring 36 to increase the supply of fuel.

As is well known heavy oils of low specific gravity are relatively cheap and these oils will furnish a greater amount of heat units than lighter oils. Heavy oils however tend to clog the supply valve.

The present invention overcomes this disadvantage by providing an agitator or paddle 40 at the lower pointed end of the valve stem 15. The paddle or agitator is arranged within the passage 12 and as the valve stem is rotated by the motor 23, the heavy oil will be agitated and broken up so as to keep the passage clear. The valve casing 10 is provided with a cleanout plug 41 for use when desired.

Instead of coupling the motor 23 directly to the valve stem, the stem 15 may have mounted thereon a pulley 42. This pulley may be driven from any suitable source of power through a belt 43. This is illustrated in Fig. 4 of the drawings wherein the stem 15 is provided with a bearing 44 arranged within a bearing bracket 45 and the stem 15 is connected with the stem 26 by means of a universal coupling 46, similar to the coupling 27.

The invention is susceptible of various changes in its form, proportions and minor details of construction and the right is herein reserved to make such changes as properly fall within the scope of the appended claims.

Having described the invention what is claimed is:

1. In a valve, a casing having a passage therethrough, a rotary needle valve extending into said casing to control said passage, means to rotate the needle valve and an agitator carried by the pointed extremity of the needle valve and operated within the passage.

2. In combination, an axially movable rotatable valve, an agitator carried by the valve, means to rotate the valve and pressure operated means to move the valve axially.

In testimony whereof we affix our signatures.

RICHARD HANRAHAN.
GEORGE LACASSE.